A. E. KEITH.
TELEPHONE SUBSCRIBER'S CALLING MECHANISM.
APPLICATION FILED AUG. 7, 1907.

1,216,323.

Patented Feb. 20, 1917.
4 SHEETS—SHEET 1.

A. E. KEITH.
TELEPHONE SUBSCRIBER'S CALLING MECHANISM.
APPLICATION FILED AUG. 7, 1907.
1,216,323.
Patented Feb. 20, 1917.
4 SHEETS—SHEET 2.
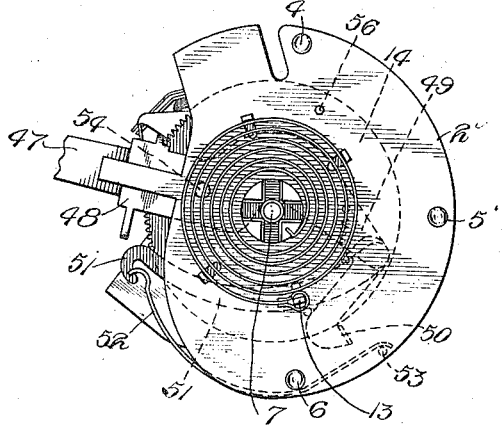
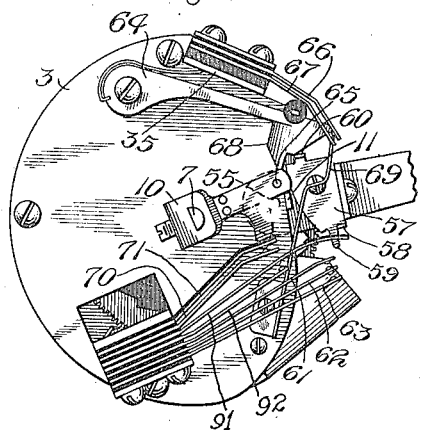

A. E. KEITH.
TELEPHONE SUBSCRIBER'S CALLING MECHANISM.
APPLICATION FILED AUG. 7, 1907.
1,216,323.
Patented Feb. 20, 1917.
4 SHEETS—SHEET 3.
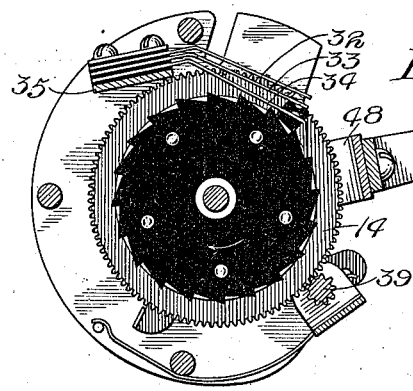
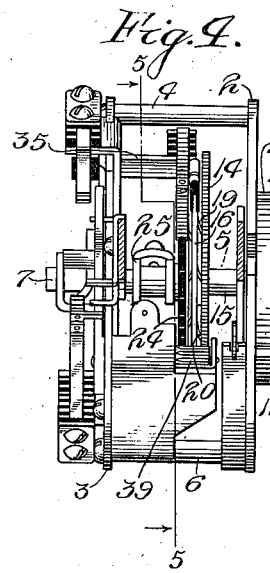
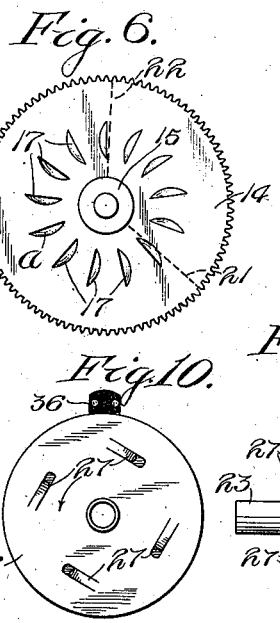
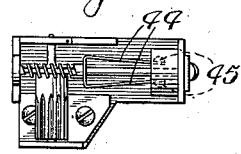
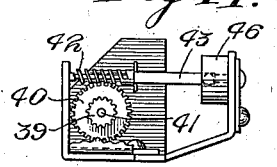
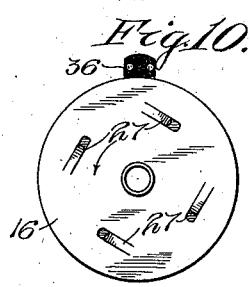
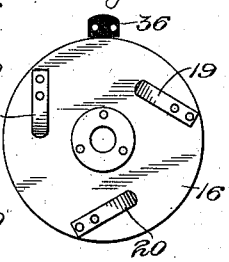
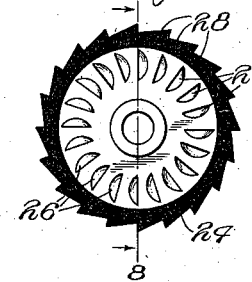
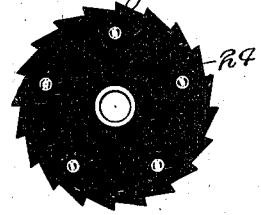
Witnesses.
A. Andersen
A. B. Sperry
Inventor:
Alexander E. Keith,
By Bulkley, Durand & Drury,
Attorneys.

A. E. KEITH.
TELEPHONE SUBSCRIBER'S CALLING MECHANISM.
APPLICATION FILED AUG. 7, 1907.
1,216,323.
Patented Feb. 20, 1917.
4 SHEETS—SHEET 4.
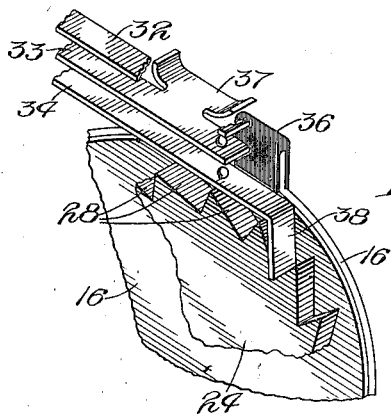
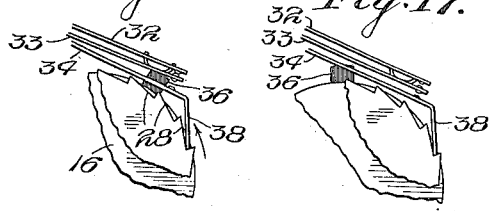
 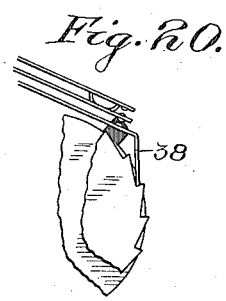
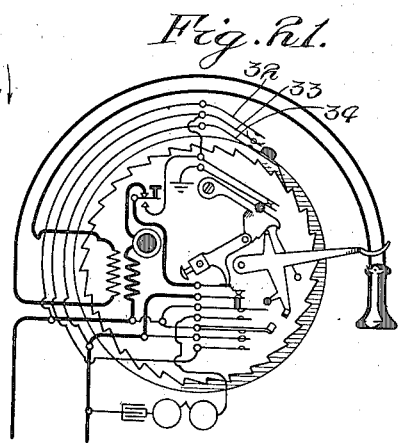
Witnesses.
A. Andersen
A. B. Sfury
Inventor:
Alexander E. Keith,
By Bulkley, Durand & Drury,
Attorneys.

UNITED STATES PATENT OFFICE.

ALEXANDER E. KEITH, OF HINSDALE, ILLINOIS, ASSIGNOR, BY MESNE ASSIGNMENTS, TO AUTOMATIC ELECTRIC COMPANY, A CORPORATION OF ILLINOIS.

TELEPHONE-SUBSCRIBER'S CALLING MECHANISM.

1,216,323.    Specification of Letters Patent.    Patented Feb. 20, 1917.

Application filed August 7, 1907. Serial No. 387,441.

*To all whom it may concern:*

Be it known that I, ALEXANDER E. KEITH, a citizen of the United States of America, and resident of Hinsdale, Dupage county, Illinois, have invented a certain new and useful Improvement in Telephone-Subscribers' Calling Mechanisms, of which the following is a specification.

My invention relates to automatic telephone systems of that character in which the calling of the called subscriber, by the subscriber making the call, consists in transmitting a number of electrical impulses from the calling subscriber's station, and in the automatic establishment of connection from the calling line to the called line, as a result of the switching operations produced by the said electrical impulses.

The principal object of my invention is the provision of an improved construction and arrangement whereby the subscriber's calling apparatus or mechanism can be embodied in a smaller structure or compass than heretofore.

It is also an object of my invention to provide certain details and features of improvement and combinations tending to increase the general efficiency of the subscriber's calling mechanism of an automatic or semi-automatic telephone exchange system.

To the foregoing and other useful ends, my invention consists in matters hereinafter set forth and claimed.

In the accompanying drawings, Figure 1 is a front elevation of a telephone apparatus embodying the principles of my invention.

Fig. 2 is a front elevation of the front section of the mechanism contained within the telephone casing, just behind the dial, shown in Fig. 1; and among the parts the front plate of the frame, or structure that supports the works, is very prominently shown; and it will be seen that the switch-hook (a part of which is indicated as broken off) is also shown at the left.

Fig. 3 is a rear elevation of the back section of the said mechanism.

Fig. 4 is a side elevation of the said mechanism including, of course, the parts shown in Figs. 2 and 3; and in addition the dial is shown at the extreme right, and a main shaft is shown that extends through the center of the apparatus, to the right extremity of which the dial is attached.

Fig. 5 is a cross-section taken on the line 5—5 in Fig. 4.

Fig. 6 is a rear elevation of the main gear which is loosely supported upon the main shaft.

Fig. 7 is a front elevation of the so-called impulse wheel which controls the impulse-transmitting springs usually found in such telephones.

Fig. 8 is a cross-section of the impulse wheel, taken on line 8—8 in Fig. 7.

Fig. 9 is a rear elevation of the impulse wheel shown in Fig. 7.

Fig. 10 is a rear elevation of an auxiliary or pawl-carrying wheel which is located between the gear wheel (Fig. 6) and the impulse wheel (Fig. 7) and rigidly secured to the main shaft.

Fig. 11 is a side elevation thereof.

Fig. 12 is a front elevation thereof.

Fig. 13 is a top elevation of a governing device which controls the speed of the dial during backward rotation thereof.

Fig. 14 is a front elevation of the same, the front bearing being removed to permit a clearer illustration of the worm and gear.

Fig. 15 is a perspective view showing the impulse springs and the operating or controlling devices associated therewith, namely the impulse wheel of Fig. 7 and the pawl wheel of Fig. 10.

Figure 1:
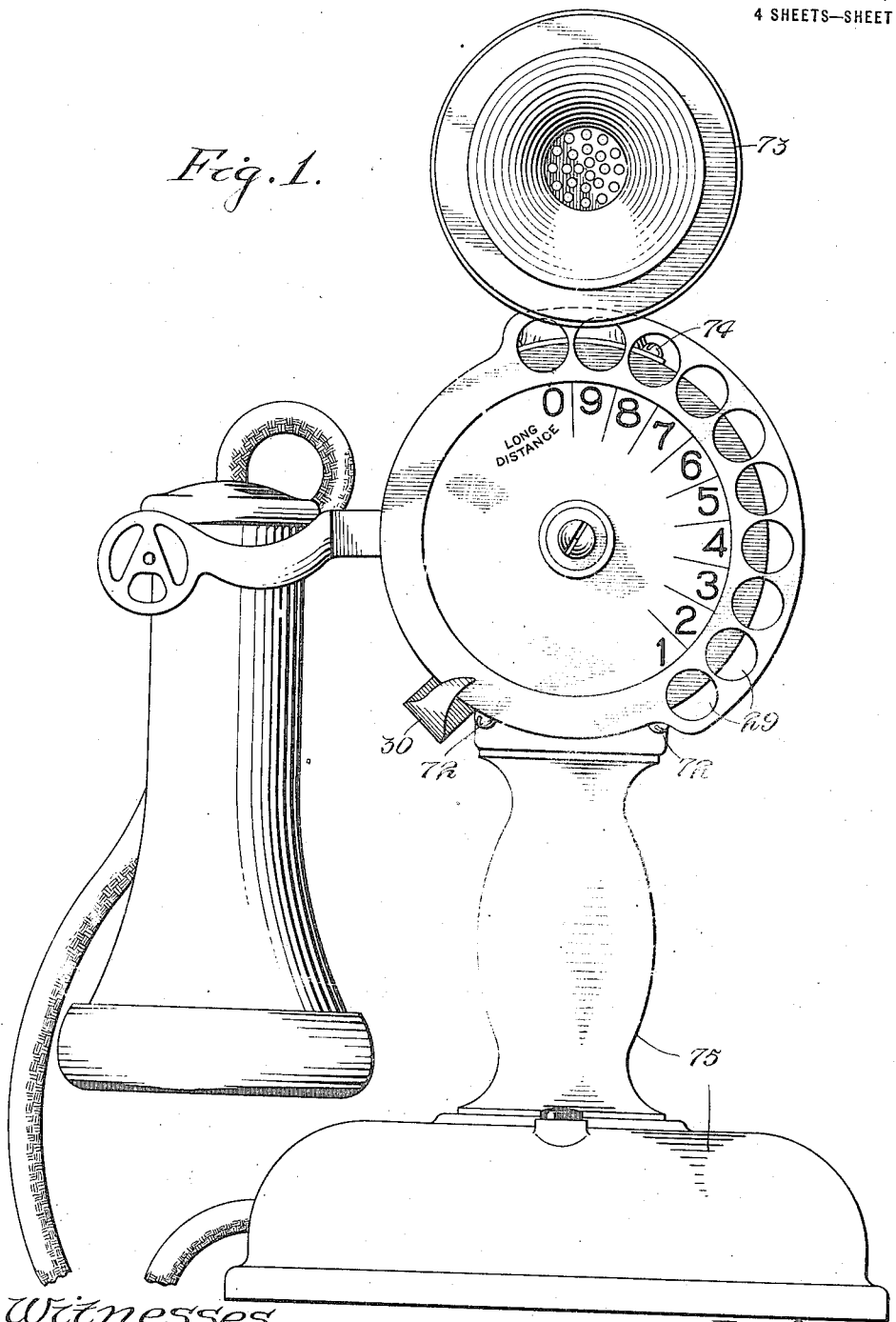

Figs. 16 to 20, inclusive, are detail views showing the apparatus of Fig. 15 at various steps in its operation.

Fig. 21 is a diagrammatic view of the telephone, in which the circuits are especially brought out and made clear.

In detail, the construction of the telephone is as follows: The plates 2 and 3 shown in Figs. 2 and 3 are clamped together, as shown in Fig. 4, by means of the tie rods 4, 5 and 6. These plates 2 and 3 act as bearings for the central shaft 7 to the right terminal of which the dial 8 is rigidly secured by a suitable screw 9. On the other extremity of said shaft 7 there is rigidly secured a cam dog 10 (Fig. 3) which normally rests against the stop 11. The dial 8, shaft 7 and dog 10, and all other parts rigidly secured to the shaft, are maintained in normal position by the clock-spring 12 (Fig. 4)

which is shown to the left of the dial 8. This clock-spring is coiled and has its inner terminal rigidly fastened to the shaft 7 and its outer terminal secured to a pin 13, which latter is driven in the front plate 2. It will be seen, therefore, with this construction, that whenever the dial (Fig. 1) is rotated forward the spring 12 is wound up, and tension thus imparted to the spring, whereby when the dial is released it is returned to normal position, which position is reached as soon as the dog 10 strikes the stop 11 (Fig. 3). Within the frame—that is, within the two plates 2 and 3—and immediately to the left of the plate 2 (Fig. 4) there is loosely mounted upon the shaft 7 the ratchet wheel 14 of Fig. 6. This wheel is provided with a suitable hub 15 which regulates its distance from the front plate 2. This ratchet wheel, furthermore, has on its rear a series of ratchet teeth 17 adapted to be engaged by suitable pawls for driving this wheel in a forward direction, Fig. 6. Immediately to the left of the ratchet wheel 14 there is rigidly mounted on the shaft the auxiliary or pawl wheel 16 (Fig. 10), with the pawls 18, 19 and 20 on the side of the ratchet wheel 14. These pawls are adapted to engage the ratchet teeth 17. More particularly, however, the arrangement is such that if the dog 18 (Fig. 12) is in the ratchet tooth a, the pawl 19 will then be resting about where the dotted line 21 is shown, while the pawl 20 will be resting about where the dotted line 22 is shown. With this arrangement it will be evident that it is necessary for the pawl wheel 16 to be advanced only one-third of the angular distance between the ratchet teeth 17 in order that some one of the pawls 18, 19 and 20 may engage one of the teeth 17 of the wheel 14. It is obvious that the same object would be accomplished were there only one pawl 18 and three times as many ratchet teeth 17 as shown. The object of this arrangement, as will be more fully shown, is to prevent the shaft 7 from returning toward normal position without the controlling governor for more than the angular distance equal to one-third the angular distance between the ratchet teeth 17. By referring to Fig. 11 it will be seen that the pawl wheel 16 is provided with a hub 23 that extends rearwardly, upon which hub 23 the impulse wheel 24 (Fig. 9) loosely revolves. This hub 23 (Fig. 11) is split so that it may be tight upon the shaft 7 after it has been put in place by any suitable means, such as a locking clamp 25 (Fig. 4). It will be seen that the impulse wheel 24 (Fig. 7) is provided on its front side with a set of ratchet teeth 26 which are adapted to be engaged by the pawls 27 of the pawl wheel 16 (Fig. 10). It will be seen that the ratchet teeth 26 (Fig. 7) correspond in number to the teeth 28 of the impulse wheel 24. The angular scope of each tooth 28 of the impulse wheel 24, it should be explained, is the same as the angular scope allotted to each finger-hole 29 in Fig. 1, for special reasons, as follows: If a finger is inserted in the hole 2 in the dial, and the dial is turned until the stop 30 is reached, the pawls 27 on the back side of the pawl wheel 16 will each drop into some one of the ratchet teeth 26; and then when the dial is released the impulse wheel is advanced by the pawls 27 a distance corresponding to a certain number of impulse teeth 28. Now, if a finger is inserted in the finger-hole 3 (Fig. 1), and the dial again rotated until the stop 30 is reached, the impulse wheel 24 will be advanced an angular distance greater than the previous distance by the angular measure of one tooth 28. With the preferred construction indicated in Fig. 4 the ratchet teeth 26 are formed in a metal disk, as shown in Fig. 7. The impulse wheel is, furthermore, provided with a hub 31 large enough to slip over the hub 23 of the pawl wheel 16 (Fig. 11). This impulse wheel is retained in proper proximity to the pawls 27 by the locking clamp 25, already mentioned, and is shown in Fig. 4. The impulse springs 32, 33 and 34, as indicated in Figs. 5 and 15, are suitably mounted upon a bracket 35 secured to the rear plate 3. These springs are suitably insulated from each other and are controlled by the impulse wheel 24 and by the lug 36 on the circumference of the pawl wheel 16. The impulse wheel is designed to transmit what are known as the vertical impulses, while the lug 36 upon the pawl wheel 16 is designed to transmit what are known as the preliminary impulses, and also to transmit what are known as the rotary impulses. By vertical and rotary impulses are meant the impulses delivered to the so-called vertical side of the subscriber's line and to the rotary side of the subscriber's line, respectively; while the preliminary impulse may be an impulse to either side of the line, although in this case only the rotary impulse is considered. This preliminary impulse is, in most instances, delivered solely for the purpose of causing a preliminary operation at the central office. In the telephone, as shown in Fig. 15, the spring 33 is known as the ground spring and the spring 32 is known as the rotary impulse spring; and the latter is also used in this case for transmitting the preliminary impulse, and the spring 34 is known as the vertical impulse spring. It will be seen that the ground spring 33 is provided with a laterally projecting lug 37 adapted to be engaged by the lug 36. Whenever the dial is drawn down the lug 36 first engages the ground spring 33, raising it into contact with the rotary spring 32, thereby sending the so-called preliminary impulse to the rotary side of the line; then, after the dial is released, and as it returns to normal position, first the impulse teeth 28 operate in successive order to raise the vertical impulse spring 34 into engagement with the ground spring 33, and before the dial reaches its normal position the lug 36 of the pawl wheel 16 again drives the ground spring 33 onto the rotary spring 32, delivering what is known as the rotary impulse. By referring to Figs. 16, 17, 18, 19 and 20 it will be seen that this is true. For example, if the finger is inserted in the dial hole 4, and the dial pulled down until the finger strikes the stop 30, it will be evident that the pawl wheel 16 (Fig. 16) is first rotated in the direction indicated by the arrow, at which time the lug 36 first presses the springs 33 and 32 into contact. After the lug 36 leaves the spring 33 the springs 32 and 33 separate, as indicated in Fig. 17, the lug 36 having passed beyond. Now when the dial is released both the impulse wheel 24 and the pawl wheel 16 rotate in the opposite direction, as indicated by the arrows in Fig. 18; then four impulse teeth 28 will pass under the angled terminal 38 of the vertical spring 34, pressing the springs 33 and 34 into contact four times, by which time the lug 36 reaches the lateral member 37 of the spring 33, raising the said spring 33 into engagement with the spring 32, and carrying, of course, the said spring 33 beyond the reach of the spring 34. The impulse teeth 28 are then unable to cause electrical impulses to be transmitted to the spring 34 after once the lug 36 engages the spring 33.

Referring to Figs. 13 and 14 it will be seen that the governor, comprising a pinion 39 and driver 40, is adapted to engage a worm 42 on a shaft 43 at right-angles to the shaft 41. Upon this shaft 43 there is a friction governor consisting of two flexible members 44 rigidly supported at their left extremity with the shaft near the right terminal of the worm, the right extremity of these springs being provided with hemispherical pieces 45. When the shaft 43 is being rotated the centrifugal force, of course, tends to throw the members 45 outwardly against the inner surface of a cylinder 46, by which means the speed of the shaft 41 is controlled. The pinion 39, as shown in Fig. 4, is located where it can be engaged by the gear wheel 14, and by which means the speed of the dial is controlled upon backward rotation. This is also shown in Fig. 5.

As indicated in Fig. 5 the switch-hook is made up of two parts, the upper portion 47 upon which the receiver is caught, and the inner section 48 which is a bifurcated member. The front prong 49 of the front member 48 is indicated in Fig. 2 by dotted lines and, as shown, is curved upwardly to clear the shaft 7. Upon the right extremity of the said prong 49 there is pivotally secured a ratchet 50 which engages the gear wheel 14, and a link 51 the left extremity of which is adapted to be engaged by the retracting spring 52. This retracting spring 52, it will be seen, is retained in position between the tie rod 6 and the pin 53. Furthermore, the bifurcated member 48 is pivotally supported between the bearing pin 54 on the front plate 2 and the bearing pin 55 on the back plate 3. Therefore, when the receiver is removed from the hook the retracting spring 52, through the medium of the link 51, raises the outer portion 47 of the switch-hook until the member 49 strikes the shaft 7. When the receiver is restored to the switch-hook, however, the member 49 rises until it strikes the pin 56 secured to the face of the front plate 2. It will be seen that the switch-hook is provided with a cam member 57 (Fig. 3) which is provided with the prongs 58, 59 and 60. The prong 59 is what is known as the release prong and is adapted, when the switch-hook is drawn down, to engage the so-called release spring 61 which is in turn pressed upon the spring 62 and the spring 62 upon the spring 63. Therefore, the three release springs 61, 62 and 63 are brought into electrical connection at the same time for a moment; but by the time the switch-hook reaches its lowermost position the prong 59 clears the spring 61 and permits the springs 61, 62 and 63 to regain their normal positions. The prong 58 is provided for the purpose of closing the usual ringer springs 91 and 92 when the switch hook is down. The prong 60 is adapted to control the locking cam 64. When the receiver is on the switch-hook the said locking cam 64 drops behind the pin 65 on the end of the locking dog 10, thus making it impossible for anyone to rotate the dial until after the receiver is removed from the switch-hook. Now, when the subscriber removes his receiver the prong 60 raises the lower end of the locking cam 64, but not sufficiently to press the so-called ground springs 66 and 67 into contact. By this operation the locking cam 64 is raised beyond the arc of rotation of the pin 65, thus unlocking the dial. Now when the dial is turned the pin 65 strikes the heel 68 of a forward section of the locking cam 64, raising the latter still a little farther, and permitting the latch spring 69 to catch this cam 64 in its highest position, thereby retaining the said ground springs 66 and 67 in contact. By referring to Fig. 3 it will be seen that the cam dog 10 controls the springs 70 and 71, so as to retain them in normal contact; but when the dial is rotated the said member 10 moves from the spring 71, permitting said spring to leave the spring 70. As indicated, the upper part of said spring 71 is insulated.

The whole mechanism is mounted upon a suitable base which fits in between the front plate 2 and the dial (Fig. 4). This base is provided at the center with an opening sufficiently large to slip over the main spring 12, and the plate 2 is secured thereto. The circumference of this base is of the proper size to fit into a casing, to which casing the base is secured by the screws 72 (Fig. 1). It will be seen that to the top of this casing the transmitter 73 is secured by means of the screws 74. In turn the casing is supported upon a stand 75 of any suitable design, under which the induction-coil and the other necessary details are located.

It will be seen, therefore, that I provide a highly efficient, highly improved mechanism for an automatic telephone which may be embodied in a very small and convenient desk set or other form of telephone apparatus. Referring to the drawings, and especially to Figs. 3, 4, and 5, the method of operation may be more clearly understood by describing the operation of the telephone, with all the parts taken together. If a subscriber wishes to call the number five he removes the receiver from the switch-hook, which latter then rises and causes the locking cam 64, as aforesaid, to unlock the dial. He then proceeds by inserting his finger in the hole 5 (Fig. 1), and pulls the dial down, as already explained, until the finger-stop 30 is reached. It will be evident that the only parts that rotate at this stage are the dial, the shaft 7, the pawl wheel 16, and the cam dog 10. The pin 65 on the dog 10 first closes the ground springs 66 and 67, thus putting ground on the ground spring 33 (Fig. 15); then as the insulating tip 36 on the pawl wheel 16 advances, the ground spring 33 is raised into engagement with the rotary spring 32, as shown in Fig. 16. Then as the tip 36 clears the spring 33, the springs regain their normal position, as shown in Fig. 17. When the finger reaches the finger stop, then the dial is released, at which time one of the springs on the right-hand face of the pawl wheel 16 engages some one of the ratchet teeth shown in Fig. 6, and at the same time the pawls on the left side of the wheel 16 each engage a ratchet tooth on the impulse wheel (Fig. 7). It may be that the pawl on the right side of the wheel 16 (Fig. 11) does not at once engage its ratchet tooth, but it is certain to do so before the dial has advanced very far. On the other hand, the pawls on the left-hand side of the wheel 16 must always engage their corresponding ratchet teeth by the time that the subscriber is ready to release his dial; then as the dial returns toward normal position, under the impelling tension of the main spring 12, not only do the pawl wheel 16 and the cam dog 10 return, but also the wheel 16 through the medium of its pawls rotates both the ratchet wheel 14 (Fig. 6) and the impulse wheel 24 (Fig. 7). This impulse wheel, as already explained, causes the vertical impulse spring 34 to be carried into contact with the ground spring 33 five times, in the manner indicated in Fig. 18, before the tip 36 on the pawl wheel 16 reëngages the ground spring 33, as indicated in Fig. 19. After this point is reached no further impulses may be delivered to the vertical impulse spring 34, because the ground spring 33 is raised beyond the reach of said spring 34 for the time being. The member 36, of course, once more raises the ground spring 33 into engagement with the rotary impulse spring 32, thus sending the rotary impulse to the line at the instant before the dial comes to the position of rest indicated in Fig. 20. It will be evident that since the speed of the impulse wheel is dependent upon the speed of the pawl wheel 16, and since the pawl wheel 16 is locked in engagement with the ratchet wheel 14, it is possible to control the length of the impulses— that is, the duration of contact between the ground and contact springs 32, 33 and 34— because of the connection between the gear wheel and the governor pinion 39. It is evident, furthermore, that the impulse wheel always goes forward and never backward, the same being true of the gear wheel 14. With this arrangement it will be evident that the number of impulses that may be transmitted by one operation of the dial is unlimited. Heretofore impulse wheels have been made which operate back and forth, and for this reason the operation of the dial was necessarily limited to a portion of its circumference; but with my invention any number of impulses may be transmitted by turning the dial around two or three times, if necessary, without stopping, and then letting it unwind itself. In that case, if each full rotation of the dial can transmit twenty impulses a continuous movement of the dial, caused by an unwinding operation consisting of five rotations, will send in one-hundred impulses.

From the foregoing it will be seen that I provide a subscriber's calling mechanism which is of a character to be embodied in a structure of comparatively less size than heretofore. The utilization of the entire circumference of the impulse wheel permits the use of a wheel of smaller diameter, without bringing the impulses too close together. The impulse wheel is normally locked against back rotation by the impulse spring 34, in the manner explained. In this way a simple ratchet wheel is capable of sending the impulses and of accomplishing the same result heretofore accomplished by mechanism which is considerably larger, and which could not be conveniently or effectively reduced in size. However, the telephone structure can be made of any desired size, and I do not limit myself to any particular construction.

What I claim as my invention is:—

1. In a telephone system, a subscriber's calling mechanism for an automatic system comprising a ratchet wheel provided with teeth made of insulating material, a spring normally resting upon said wheel and holding the same against backward rotation, a circuit-controlling contact intermittently engaged by said spring when the ratchet wheel is rotated, and means for variably rotating said wheel in accordance with the digits of the called number.

2. In a telephone system, a subscriber's calling mechanism for an automatic system comprising a ratchet wheel provided with teeth made of insulating material, a spring normally resting upon said wheel and holding the same against backward rotation, a circuit-controlling contact intermittently engaged by said spring when the ratchet wheel is rotated, a dial rotatable in a forward and back manner, means for variably limiting the rotation of the dial in accordance with the digits of the called number, and means for rotating the ratchet wheel while the dial is returning to normal position.

3. In a telephone system, a subscriber's calling mechanism comprising an impulse wheel for transmitting the so-called vertical impulses, a pawl wheel provided with means for engaging and rotating the said impulse wheel, means operated by the pawl wheel for transmitting a preliminary impulse ahead of the said vertical impulses, and adapted also to transmit a so-called rotary impulse by the backward or return rotation of said pawl wheel.

4. In a telephone system, a subscriber's calling mechanism comprising one wheel for transmitting the so-called preliminary impulse and the final rotary impulse, and another and separate wheel for transmitting the intermediate or so-called vertical impulses.

5. In a telephone system, a subscriber's calling mechanism comprising an impulse wheel for transmitting the so-called vertical impulses, a pawl wheel provided with means for engaging and rotating the said impulse wheel, means operated by the pawl wheel for transmitting a preliminary impulse ahead of the said vertical impulses, and adapted also to transmit a so-called rotary impulse by the backward or return rotation of said pawl wheel, and a dial rotatable in a forward and back manner and adapted by its backward or return rotation to operate the said vertical impulse wheel.

6. In a telephone system, a subscriber's calling mechanism comprising one wheel for transmitting the so-called preliminary impulse and the final rotary impulse, another and separate wheel for transmitting the intermediate or so-called vertical impulses, and a dial rotatable in a forward and back manner and adapted by its backward or return rotation to operate the said vertical impulse wheel.

7. In a telephone system, a subscriber's calling mechanism comprising a shaft, a dial rigid with said shaft and rotatable in a forward and back manner, a pawl wheel rigid with said shaft, an impulse wheel loose on the shaft, means on the pawl wheel for rotating the impulse wheel while the dial is returning to normal position, a projection on the pawl wheel, and a switch spring operated by said projection upon both forward and backward rotation of the dial.

8. In a telephone system, a subscriber's calling mechanism comprising a shaft, a dial rigid with said shaft and rotatable in a forward and back manner, a pawl wheel rigid with said shaft, an impulse wheel loose on the shaft, means on the pawl wheel for rotating the impulse wheel while the dial is returning to normal position, a projection on the pawl wheel, a switch spring operated by said projection upon both forward and backward rotation of the dial, and means also operated from said pawl wheel for governing the backward or return rotation of the dial.

9. In a telephone system, a calling mechanism for an automatic system comprising an impulse-transmitting device provided with springs and a rotary spring-operating member, said device operable in one direction only, insulating means for preventing the closure of circuit through the said rotary spring-operating member, and means for varying the rotation of said impulse wheel in accordance with the different digits of the called number, as set forth.

10. In a telephone system, a calling mechanism comprising an impulse transmitting device provided with a pair of line impulse springs, a ground spring, a pair of spring operating members, a shaft on which one of said spring operating members is rigidly mounted, means for variably operating said shaft to operate said members to transmit switching impulses thereover from said ground spring, a fixed stop for variably limiting the motion of one of said members, and means for varying the rotation of said members in accordance with the different digits of the called number.

11. In a telephone system, a calling mechanism comprising an impulse-transmitting device for transmitting primary and secondary impulses, a shaft, a plurality of impulse springs, a spring-operating member for causing transmission of the primary impulses, said member loosely mounted on said shaft, and another spring-operating member for causing the transmission of said secondary impulses, said last-mentioned operating member being rigidly connected with the shaft, and means for permitting the manual manipulation of said shaft for transmitting the impulses.

12. In a telephone system, a calling mechanism comprising an impulse-transmitting device for transmitting primary and secondary impulses, a shaft, a plurality of impulse springs, a spring-operating member for causing the transmission of the primary impulses, said member loosely mounted on said shaft, and another spring-operating member for causing the transmission of said secondary impulses, said last-mentioned spring-operating member being rigidly connected with the shaft, means for permitting the manual manipulation of said shaft to transmit the impulses, and a governor for controlling the operation of said impulse-transmitting device.

Signed by me at Chicago, Cook county, Illinois, this 5th day of August, 1907.

ALEXANDER E. KEITH.

Witnesses:
TALBOT G. MARTIN,
EDWARD D. FALES.